United States Patent [19]

Terashita

[11] Patent Number: 4,707,118
[45] Date of Patent: Nov. 17, 1987

[54] METHOD FOR CONTROLLING EXPOSURE IN COLOR PHOTOGRAPHIC PRINTERS

[75] Inventor: Takaaki Terashita, Ashigara-Kamigun, Japan

[73] Assignee: Fuji Photo Film Co., Ltd., Minami-Ashigara, Japan

[21] Appl. No.: 937,470

[22] Filed: Dec. 2, 1986

Related U.S. Application Data

[63] Continuation of Ser. No. 709,122, Mar. 6, 1985, abandoned.

[30] Foreign Application Priority Data

Mar. 13, 1984 [JP] Japan .................................. 59-48776
Apr. 17, 1984 [JP] Japan .................................. 59-77304
Dec. 12, 1984 [JP] Japan .................................. 59-261971

[51] Int. Cl.⁴ .............................................. G03B 27/78
[52] U.S. Cl. ........................................ 355/38; 355/77
[58] Field of Search ........................... 355/38, 68, 77; 356/404, 443

[56] References Cited

U.S. PATENT DOCUMENTS

| | | | |
|---|---|---|---|
| 3,184,307 | 5/1965 | Letzer | 355/38 X |
| 3,502,410 | 3/1970 | King et al. | 355/38 |
| 4,175,856 | 11/1979 | Pone, Jr. | 355/38 X |
| 4,176,946 | 12/1979 | Takahashi | 355/38 |
| 4,279,502 | 7/1981 | Thurm et al. | 355/38 |
| 4,362,383 | 12/1982 | Yonehara et al. | 355/71 |
| 4,464,045 | 8/1984 | Findeis et al. | 355/38 |
| 4,589,766 | 5/1986 | Fürsich et al. | 355/38 |

Primary Examiner—L. T. Hix
Assistant Examiner—D. Rutledge
Attorney, Agent, or Firm—Wenderoth, Lind & Ponack

[57] ABSTRACT

In conventional color photographic printers, it is emperically known that the LATD balance of RGB is substantially constant. If the exposures of three primary color components are controlled to be constant in photographic printing, standard color film negatives may be printed with excellent color balance. However, the above LATD control method is not always effective for the film negatives where a specific color is dominant, and those films are often printed with poorly balance color. The present method performs exposure control of RGB with color compensation filters controlling the color with the color compensation filter amount dependent upon factors such as the filter position, filter density, transmission factor, amount of light, etc. This method can therefore control the exposure control values at a high precision without disturbing color balance for all types of films. This method can also prevent fluctuations in density which might otherwise be entailed by the changes in color correction level so as to thereby precisely deal with changes in the sensitivity of the materials of the development process.

8 Claims, 13 Drawing Figures

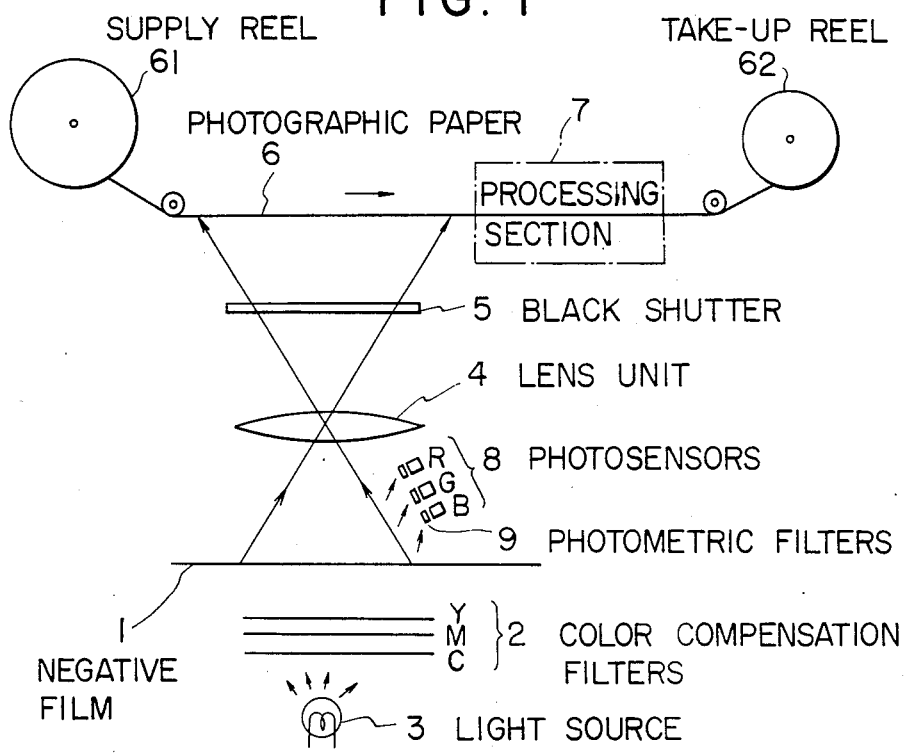
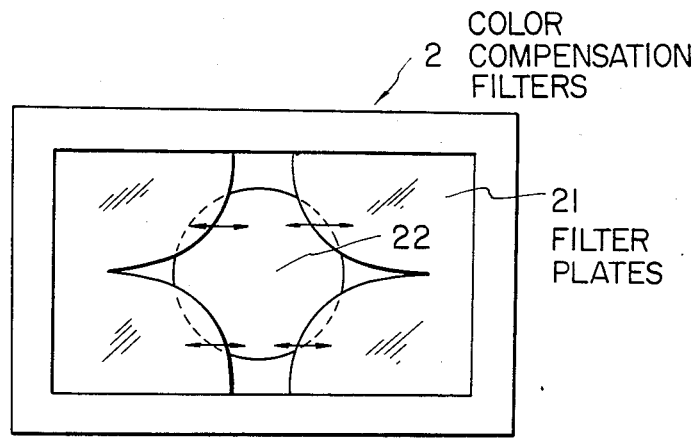
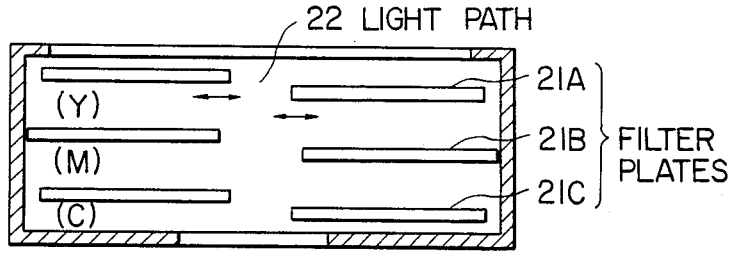

METHOD FOR CONTROLLING EXPOSURE IN COLOR PHOTOGRAPHIC PRINTERS

This application is a continuation of now abandoned application Ser. No. 709,122, filed Mar. 6, 1985.

BACKGROUND OF THE INVENTION

This invention relates to a method for controlling exposure in color photographic printers.

In order to print color photographs of a high quality, it is necessary to appropriately control the accurate measuring of a color original picture, and to precisely control the exposure and to appropriately determine the amount of light impinging onto a photosensitive material, and to optimally control the conditions in a photographic printer. Color original pictures may be color negative films, color reversal films, or color papers. Photosensitive materials may be color papers or color positive films.

In color negative paper system of an ordinary photographic printer currently used, a reference film negative (the film negative having an average density of the users' photographs) is usally used as a reference to control the printing conditions so as to secure printing at a predetermined density.

There are currently two exposure control processes in use; i.e. the additive color process and the subtractive color process. The additive color process is classified into the consecutive exposure process and the simultaneous exposure process of the primary colors. The additive process is the process of high-correction control. The subtractive process is adapted to consecutively control the exposure of RGB by restricting white light with filters (cut filters) of C (cyan), M (magenta) and Y (yellow). The subtractive process is classified into high-correction and lowered-correction types. The color compensation filter process is another process widely used in enlargers conventionally.

FIG. 1 shows an embodiment of the photographic printers of color compensation filter type wherein a film negative 1 is illuminated with light from a light source 3 via color compensation filters 2 of yellow (Y), magenta (M) and cyan (C). The light transmitted from the film negative 1 is guided onto a photographic paper 6 for printing via a lens unit 4 and a black shutter 5. The photographic paper 6 is reeled out from a supply reel 61. The photographic paper 6 after exposed at the printing section is processed at the processing section 7 for development, bleaching, fixing, washing and drying and then rolled on a take-up reel 62. At a location near the film negative 1 on the side of the lens unit 4 is arranged photosensors 8 such as photodiodes for detecting the image density for the three primary colors of red (R), green (G) and blue (B). The printing conditions are determined by the density detection signals for each of RGB from the photosensors 8 and the film negative 1 which has been conveyed to the printer section is printed under such conditions.

The filters 2 provided for color compensation may have a structure such as that shown in FIGS. 2A and 2B. Three filter plates 21 (21A through 21C) having a sectral quadrant shape are combined for each of the three colors of yellow (Y), magenta (M) and cyan (C). The light transmitted through a central light path 22 is controlled for each color by horizontal relative movement of each pair of filter plates 21A through 21C. The movement of the filter plates 21A through 21C are controlled by a control device (not shown) for respective colors. The filters plates 21A through 21C are approximated to the spectral transmittance distribution of the film negative dye so that exposure control can be performed precisely.

In such a color photographic printer, color failure or density failure is artificially corrected. It is emperically known that the LATD (Large Area Transmittance Density) balance in blue (B), green (G) and red (R) is substantially constant on a frame of standard color negative films. It is therefore a general practice in printing to measure the LATD of the three primary colors of BGR and control the exposure for the three primary color components at a constant value. In this way an excellent print of well-balanced colors can be obtained from a standard color film negative.

The above mentioned LATD control method, however, is not necessarily effective for the color film negative on which a specific color is dominant, and frequently produces defective prints with ill-balanced color. In order to deal with those problems, a photographic printer is generally equipped with color correction means of lowered-correction, normal-correction and high-correction levels to compensate the colors in negative films. More particularly, the lowered-correction method is a control process to apply correction in the amount of light of relatively low level against the relative changes in the LATD for three primary color components of a film negative and is suitable for the color failures caused by uneven color distribution of an object. The full-correction method is a control process to apply a certain amount of light to neutral (gray color) which is the result of the integration of three primary colors. This is suitable for correcting the negative films affected from different light sources or the negative films where latent images fade in the layer sensitive to a specific color.

The correction in the level of light suitable for the majority of negative films is referred to as a normal-correction which is lowered from the full-correction with respect to the amount of light to be exposed. The high-correction is at a level of light which is higher than the normal-correction level. Conventionally, the spectral characteristics of a light receiver of a printer, and the filter characteristics of the exposure control filter, etc. of a printer are insufficient to be used in full-correction, often resulting in the mixing of three primary color exposures and inevitably lowering the light level of correction. Full-correction can not be attained even if the intensity of the correction is increased so far as this condition prevails. Furthermore, high-correction is ineffective for color correction of different light sources under the conditions where full-correction can not be achieved. When color correction is changed with respect to the level of light, the print density is visually changed. Therefore, density as well as color should be corrected. This presents another difficulty.

Color compensation filters realize precise photomeasure and exposure control and therefore enable preparing conditions for full-correction. Then, a correction which is lowered from the full-correction with respect to its light amount enables performing an exposure control with good color balance on all of the films. Correction performance will also be improved for gradation changes in a film negative. This compensation filter type process can perform printer light source change correction at the same time as the exposure control. In the prior art, however, above mentioned advantages were not fully exploited because there was no process for precisely determining the exposure and controlling the filters.

SUMMARY OF THE INVENTION

This invention is conceived in view of the aforementioned situations and aims at providing an exposure control method of excellent precision and color balance for color photographic printers.

Another object of this invention is to provide an exposure control method of excellent color balance for color photographic printers using compensation filters and, more particularly a simple method for changing the amount of light in color correction.

According to this invention, in one aspect thereof, for achieving objects described above, there is provided a control method for controlling the exposure in a color photographic printer which changes and controls the amount of light in three primary colors for printing, which is characterized in that the density of a film to be printed is photographically measured, and a printing exposure is obtained and a printing density is estimated, and an amount of correction is obtained from an intended value and said estimated value, and the amount of correction is either added or subtracted from said printing exposure.

According to this invention, in another aspect thereof, for achieving objects described above there is provided a control method for controlling the exposure in a color photographic printing system changes and controls the amount of light in the three primary colors for printing, which is characterized in that color compensation filters are driven for correction changes caused by the light source during printing, and the density of a film negative is measured under a predetermined light source, and an amount of filter correction for the changes caused by the changes in the correction level is obtained from the amount of printing filter under the reference color correction conditions and an estimated printing density, and the displacement of said color compensation filters caused in the above operation is calculated and said color compensation filters are driven in accordance with the displacement.

According to this invention, in still another aspect thereof, for achieving objects described above, there is provided a control method for controlling the exposure in a color photographic printing system which changes and controls the amount of light of the three primary colors for printing, which is characterized in that exposure control values after said change are corrected in a manner that the weighted coefficient for the exposure control values and said three primary colors before said change or the first functions corresponding to specific visual sensitivity coefficient are made to coincide with the weighted coefficients for said exposure control values and said three primary colors after the change or the second functions corresponding to said specific visual sensitivity coefficients.

Further, according to this invention, in another aspect thereof, for achieving objects described above, there is provided a control method for controlling the exposure in a color photographic printing system which changes and controls the exposure of the three primary colors for printing, which is characterized in that the exposure for said three primary colors is corrected first by the full-correction and then by the lowered-correction, and the printing density by said full-correction is made to coincide with the printing density by said lowered-correction with respect to the specific visual sensitivities by correcting the exposure control values.

Still further, according to this invention, in another aspect thereof, for achieving objects described above, there is provided a control method for controlling the exposure in a color photographic printing system which changes and controls the amount of light in the three primary colors for printing, which is characterized in that said amount of color compensation filter which changes the amount of color correction is determined by the functions of said amount of color compensation filter before the changes in the color correction level.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a schematic view to show the structure of an embodiment of color photographic printers;

FIG. 2A is a plane view to show an embodiment of compensation filters used in the color photographic printers;

FIG. 2B is a side sectional view thereof;

DETAILED DESCRIPTION OF THE INVENTION

The exposure correction according to this invention is performed by means of color compensation filters and controlled with the functions of the amounts of color compensation filters such as filter density, transmission factors, light amounts, etc. In the photographic printer shown in FIG. 1, when color compensation filters 2 are controlled in a manner to make the sum of the density of a film negative 1 and the density of color compensation filters 2 constant, full-correction can be achieved if the spectral sensitivity distribution of RGB of photosensors 8 coincides with that of a photographic paper 6.

Figure 3:
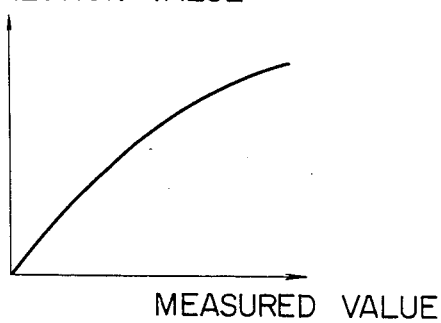
FIGS. 3 through 5 are views to explain the preparation for full-correction according to this invention and the effect thereof.

Full-correction represents a condition under which a print having a predetermined three color density (gray) can be obtained even from negative films of different color balances as the spectral sensitivity distribution of the photometric system of the photosensors 8 which determines the exposure of the printer completely coincides with the spectral sensitivity distribution of the photographic paper 6. In order to prepare such a condition, it is necessary to make the spectral sensitivity distributions of the photometric system including the photosensors 8 and of the photographic paper for printing, but it is difficult to make both completely coincide with each other merely by adjusting the sensitivity distributions with photometric filters 9. It is therefore necessary to make a correction table corresponding to the curve shown in FIG. 3 for each of the colors R, G and B in order to perform the full-correction for the measured value by the photosensors 8. Alternatively, the operation formula shown below may be referred using all through a33 as coefficients for the measured values B', G' and R'.

$$\begin{bmatrix} B \\ G \\ R \end{bmatrix} = \begin{bmatrix} a11 & a12 & a13 \\ a21 & a22 & a23 \\ a31 & a32 & a33 \end{bmatrix} \begin{bmatrix} B' \\ G' \\ R' \end{bmatrix} \quad (1)$$

The correction table and the operation formula (1) may be prepared by obtaining values in advance either by computation or experiments using the spectral characteristics of the photographic paper which is to be used for printing, and then measuring the actual amount of light of the paper with photosensors 8 and then comparing both values.

Optical conditions in full-correction may be affected by the following factors: spectral distribution of the light source 3, the spectral transmission factor distribution of the color compensation filters 2, the spectral sensitivity distribution of the film negative 1, the spectral sensitivity distribution of the combination of the photosensors 8 and the photometric filters 9 and spectral sensitivity distribution of the photographic paper 6. When the spectral sensitivity distribution differs between the photographic paper and the photometric system, each of the above factors may affect the condition in various complicated manners depending on the types of negative films 1 and photographic paper 6. It is therefore desirable to store, in a memory of the printer, the values corrected by the above correction table or the formula (1) concerning each of the photographic materials for use and select the suitable one at the time of printing.

Figure 4:
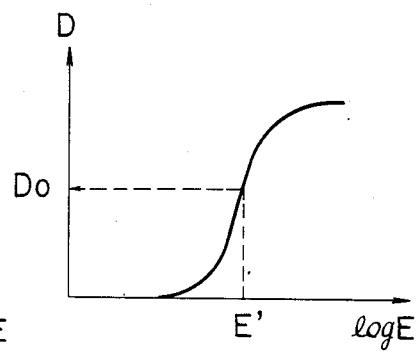

When these conditions for full-correction are met, the controlled values of each color exposure and the color variation in printing can be caused to correspond to each other in a one-to-one relationship and the printing process can be quantified. More specifically, the relationship between the logarithmic values of the exposure E onto the photographic paper 6 and the print density D has the characteristics shown in FIG. 4 and the exposure E' after transmission through the film negative 1 can be obtained by the density value $D_o$ of the film negative measured by the photosensors 8 and the exposure time. This is because the effective illumination onto the photographic paper 6 can be estimated according to the density value $D_o$. When the gradation characteristics of the photographic paper 6 is given, the printing density $D_o$ can be estimated. The density value $D_o$ of negative films is equivalent to the printing density generally used in the color production theory (refer to "Shashin Kogaku no Kiso (Basics of Phototechnology)", Nihon Shashin Gakkai, 1979, p 387). The value $D_p$ measured by the photosensors 8 can be expressed as the formula below shows if the luminance of the light source 3 is $J_\lambda$, the transmission factor of the negative film is $T_\lambda$ and the spectral sensitivity of the photographic paper 6 (=spectral sensitivity of the photosensors 8) is $S_\lambda$.

$$D_p = -\log \frac{\int J_\lambda T_\lambda S_\lambda d\lambda}{\int J_\lambda S_\lambda d\lambda} \quad (2)$$

Figure 5:
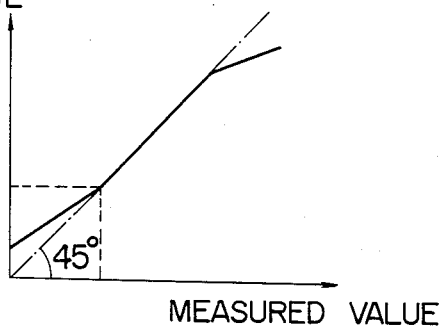
Figure 6:
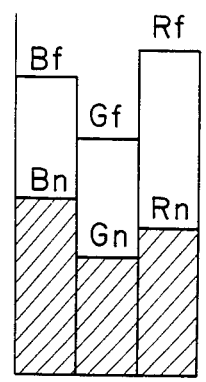
FIG. 6 is a view to describe the amount of a color compensation filter in full-correction according to this invention.

Since $\int J_\lambda S_\lambda d\lambda$ is constant, the effective illumination $\int J_\lambda T_\lambda S_\lambda d\lambda$ onto the photographic paper 6 can be obtained from measured value $D_p$ from the photosensors 8 and the exposure E' can be estimated from the exposing time. As shown in FIG. 5, the values of slope control can be made constant (nearly equal to 1.0) against the linear section of the characteristic curve of the negative film 1 by the full-correction irrespective of gradation; it is not necessary to adjust slope-controlled values against the gradation changes of the film negative 1 (such as the fluctuation of the types of photographic materials, fluctuation in processing, etc.). However, in the case of negative films which have color failure factors, even if slightly, the negative films should be subjected to the lowered-correction by changing the amount of the color compensation filters 2 depending on the full-correction shown in FIG. 6. If we assume that the measured values of each color at full-correction are Bf, Gf and Rf and the density values of each color of the film negative 1 are Bn, Gn and Rn, the compensation filter volumes Bc, Gc and Rc can be obtained from the formula below as shown in FIG. 6.

$$\left. \begin{array}{l} Bc = Bf - Bn \\ Gc = Gf - Gn \\ Rc = Rf - Rn \end{array} \right\} \quad (3)$$

Measured values Bf, Gf and Rf represent herein the values which do not include a correction amount for light source variations and an exposure correction amount for obtaining the printing density.

Figure 7:
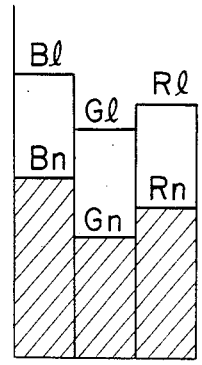
FIG. 7 is a view to explain the color compensation filter volume for lowered-correction.

For lowered-correction, the exposure at full-correction is calculated as a function of the exposure amount of the color compensation filters and the amount of the color compensation filter is changed in order to perform the control as shown in FIG. 7. The photometric values adjusted for lowered-correction or the sum of the density value of the film negative and the density value of the color compensation filter becomes as below wherein the color correction coefficients are LB, LG and LR.

$$\left. \begin{array}{l} Bl = LB \cdot (Bc - Df) + Df + Bn \\ Gl = LG \cdot (Gc - Df) + Df + Gn \\ Rl = LR \cdot (Rc - Df) + Df + Rn \end{array} \right\} \quad (4)$$

wherein $Df = (Bc + Gc + Rc)/3$.

If it is assumed that the above mentioned color correction coefficients have the relationship that LB=LG=LR=0.0, then the above formula can be converted to:

$$\left. \begin{array}{l} Bl = Df + Bn \\ Gl = Df + Gn \\ Rl = Df + Rn \end{array} \right\} \quad (5)$$

which means that the same amount of the color compensation filter can be applied for all of RGB to completely achieve lowered-correction. On the other hand, if the color correction coefficients have the relationship that $LB=LG=LR=1.0$, the above formula (4) can be converted to:

$$\begin{rcases} Bl = Bc + Bn = Bf \\ Gl = Gc + Gn = Gf \\ Rl = Rc + Rn = Rf \end{rcases} \quad (6)$$

and full-correction can be performed. Accordingly, corrections can be switched from lowered-correction to full-correction by changing the color correction coefficients LB, LG and LR based on the above formula (4).

In the case of the coefficients b11 through b33 are $b11=(1+2 \cdot LB)/3$, $b12=(1-LB)/3$, $b13=(1-LB)/3$, $b21=(1-LG)/3$, $b22=(1+2 \cdot LG)/3$, $b23=(1-LG)/3$, $b31=(1-LR)/3$, $b32=(1-LR)/3$, $b33=(1+2 \cdot LR)/3$, the above formula (4) can be converted to:

$$\begin{bmatrix} Bl \\ Gl \\ Rl \end{bmatrix} = \begin{bmatrix} b11 & b12 & b12 & Bn \\ b21 & b22 & b23 & Gn \\ b31 & b32 & b33 & Rn \end{bmatrix} \begin{bmatrix} Bc \\ Gc \\ Rc \\ 1 \end{bmatrix} \quad (7)$$

This formula (7) is generally expressed as follows:

$$\begin{rcases} Bl = f(Bc, Gc, Rc, Bn) \\ Gl = f(Bc, Gc, Rc, Gn) \\ Rl = f(Bc, Gc, Rc, Rn) \end{rcases} \quad (8)$$

Color correction is controlled in a manner to determine the printing exposure at Bl, Gl and Rl by means of the relationship in density between color compensation filters and the film negative before color correction.

Figure 8A:
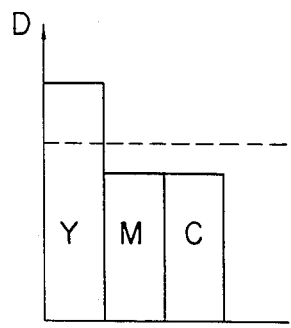
FIGS. 8A and 8B are the views to show how to change the level of light from full-correction to lowered-correction.
Figure 8B:
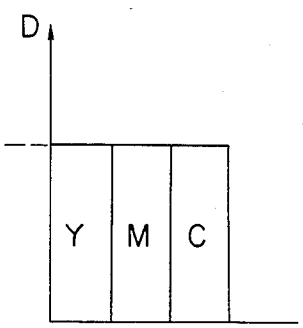

Although the exposures for each of the three colors are changed by varying the correction volume, it is necessary to make the visual densities before and after the change the same. FIG. 8A shows the printed densities of Y, M and C of an object of neutral color in the case where color failure occurs in the color of blue. In this case, it is necessary to make the densities on the photographic paper (as shown in FIG. 8B) coincide with each other visually further by lowered-correction. Even in a case when color correction is made manually by manipulating color correction keys which are generally provided on photographic printer, the density should be simultaneously corrected as the density variations. For such a case the method of this invention is applicable, too.

Figure 9:
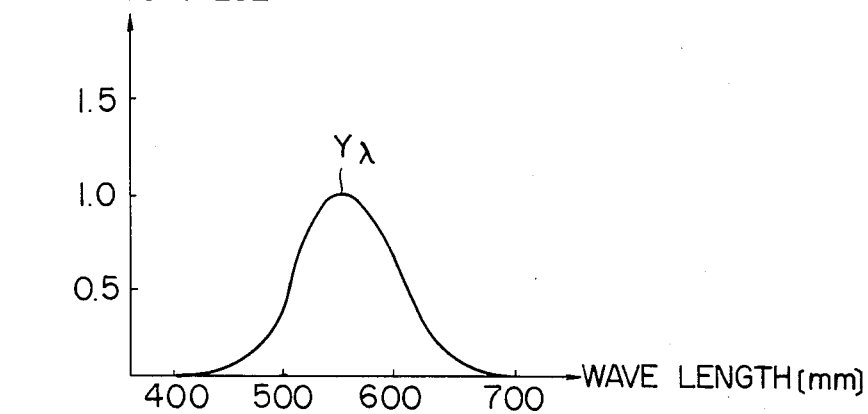
FIG. 9 is a graph of specific visual sensitivity functions.

If it is assumed that i=B, G and R, the light controlled values before the changing is expressed by EOi, and the light controlled values after the changing Ei, and the $\gamma$ value of the photographic paper 6 $\gamma i$, then the relative spectral reflection density $Di\lambda$ of the photographic paper 6 ($Di\lambda$ is the relative spectral reflection density of the dyes of Y, M and C of respective photosensitive layers of B, G and R); and the specific visual sensitive function as shown in FIG. 9 is expressed as $V\lambda$, the relationship of the formula below theoretically holds in order to make the visual reflection factors before and after the correction visually coincide with each other.

$$\int V_\lambda \cdot 10^{-(\Sigma EOi \cdot \gamma i \cdot Di\lambda)} d\lambda = \int V_\lambda 10^{-(\Sigma(Ei+K) \cdot \gamma i \cdot Di\lambda)} d\lambda \quad (9)$$

The letter K in the above formula denotes the amount of exposure correction necessary to make the reflections identical before and after the correction. The specific visual sensitivity function $V_\lambda$ is determined by CIE. (See the Shikisai Kagaku Handbook, Nippon Shikisai Gakkai, 1980. P. 26). However, the formula (9) is not practical and it is advisable to use the contribution ratio of the three dyes (YMC→1, 2, 3) of the photographic paper for visual density.

$$\Sigma \begin{bmatrix} D11' & D12' & D13' \\ D21' & D22' & D23' \\ D31' & D32' & D33' \end{bmatrix} \begin{bmatrix} E01 \cdot \gamma 1 \\ E02 \cdot \gamma 2 \\ E03 \cdot \gamma 3 \end{bmatrix} =$$

$$\Sigma \begin{bmatrix} D11' & D12' & D13' \\ D21' & D22' & D23' \\ D31' & D32' & D33' \end{bmatrix} \begin{bmatrix} (E1+K) \cdot \gamma 1 \\ (E2+K) \cdot \gamma 2 \\ (E3+K) \cdot \gamma 3 \end{bmatrix} \quad (10)$$

D11' denotes the contribution ratio for the visual density of the B component of yellow dye, D21' that for the G component of yellow dye and D31' that for the R component of yellow dye and they are respectively obtained by experiments. For a simple procedure, the relationship below holds wherein $i \neq j$ at Dij', and it is 0 or when an auxiliary absorption of the three primary colors is not taken into account, $$D11' \cdot E01 \cdot \gamma 1 + D22' \cdot E02 \cdot \gamma 2 + D33' \cdot E03 \cdot \gamma 3 = D11' \cdot (E1 \cdot K) \cdot \gamma 1 + D22' \cdot (E2+K) \cdot \gamma 3 + D33' \cdot (E3+K) \cdot \gamma 3 \quad (11)$$

From the above formula, the value k can be calculated and the value of light amount control after the change can be corrected. Dij' and $\gamma i$ are characteristics of a photosensitive material and prepared in advance. Reflective materials have non-linear characteristics, but errors can be minimized if the density range is limited to be within 0.5 to 1.0. The printing density can be estimated without actually conducting printing if the precise photometric values are obtained for a film negative and the exposure is precisely controlled. Thus, the obtained estimate printing density values are corrected further to obtain more desirable printing density values to control the exposure. The exposure control with estimated printing density values is not limited to a compensation control process but can be applied to any process. This invention includes all the exposure control methods which are deduced based on the above concept even if the operation formulae or the control formulae do not include a term corresponding to the estimated printing density value.

The left-hand members of the formulae (9) through (11) represent intended values or the estimated printing density values. More particularly, the amount in exposure correction is obtained first from an estimated values (the left-hand side of a formula) of printing density at the reference condition and from another estimated printing density at a different condition (the right-hand side of the formula), and then either the former or the latter exposure amount is corrected for control. This method can be applied to all cases not only for visual density control for changes in color correction but also for control and correction of changes of printing density caused by the changes in conditions. Printing conditions of a type of film can be obtained from the printing condition of the reference film. Furthermore, from the printing conditions of reference development performance can be obtained by printing conditions after development process. Moreover, over- or under-printing conditions can be obtained from the printing conditions of the reference exposure film negative. In order to achieve such estimation at a high precision, it is sufficient to store in advance the characteristic of copying materials or spectral and gradation characteristics thereof.

Figure 10:
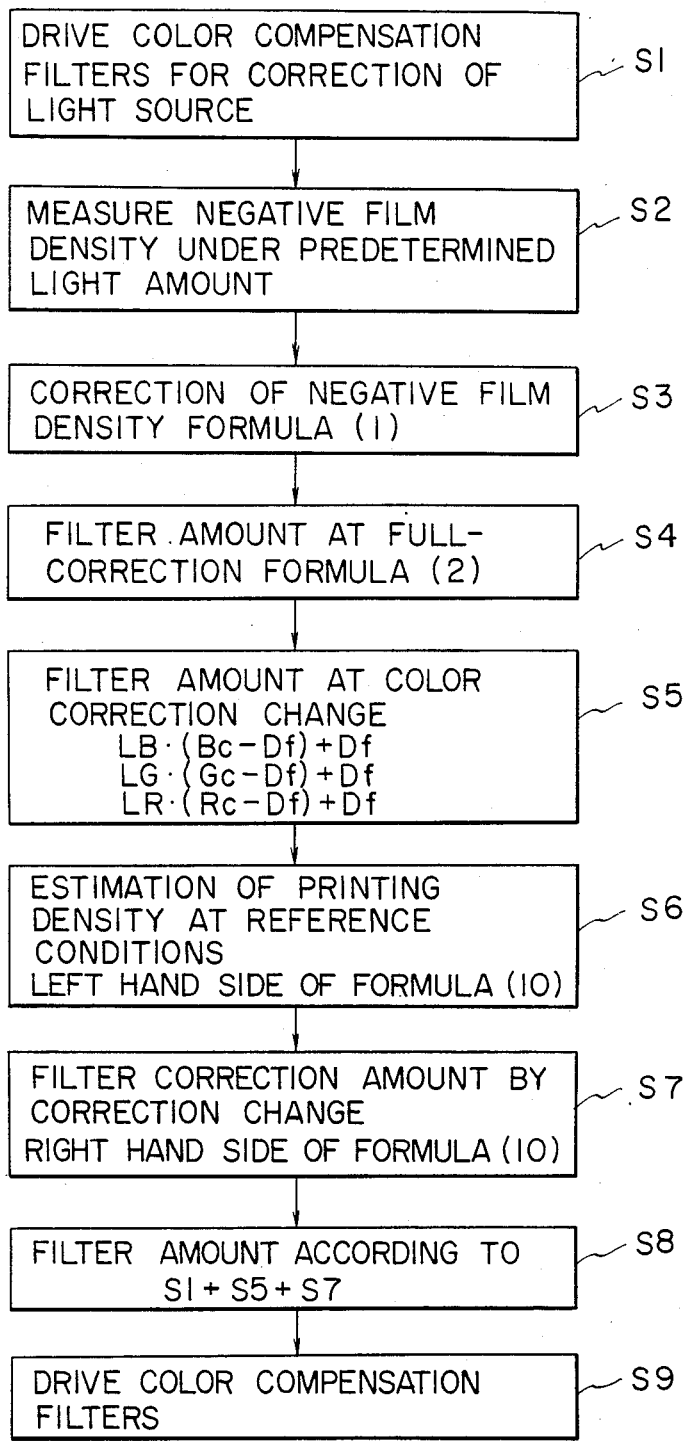
FIG. 10 is a flow chart of the operation of this invention.

FIG. 10 shows the flow of the correction procedure of the color compensation filters 2 (steps S1 through S8) wherein the filter amount at the time of the change in color correction is obtained by the above formula (3) (Step 5) and the correction amount of the color compensation filters 2 caused by the change in correction can be obtained from the right-hand side of the above formula (10) (Step S7). The final correction amount required for driving the color compensation filters 2 is obtained by adding the driving volume of the color-compensation filters 2 for printing the light source correction obtained at Step S1, and the displacement volume obtained at Step S5 and the correction volume obtained at Step S7 (Step S8). With this correction value, the color compensation filters 2 are driven by a drive means (Step S9).

Figure 11:
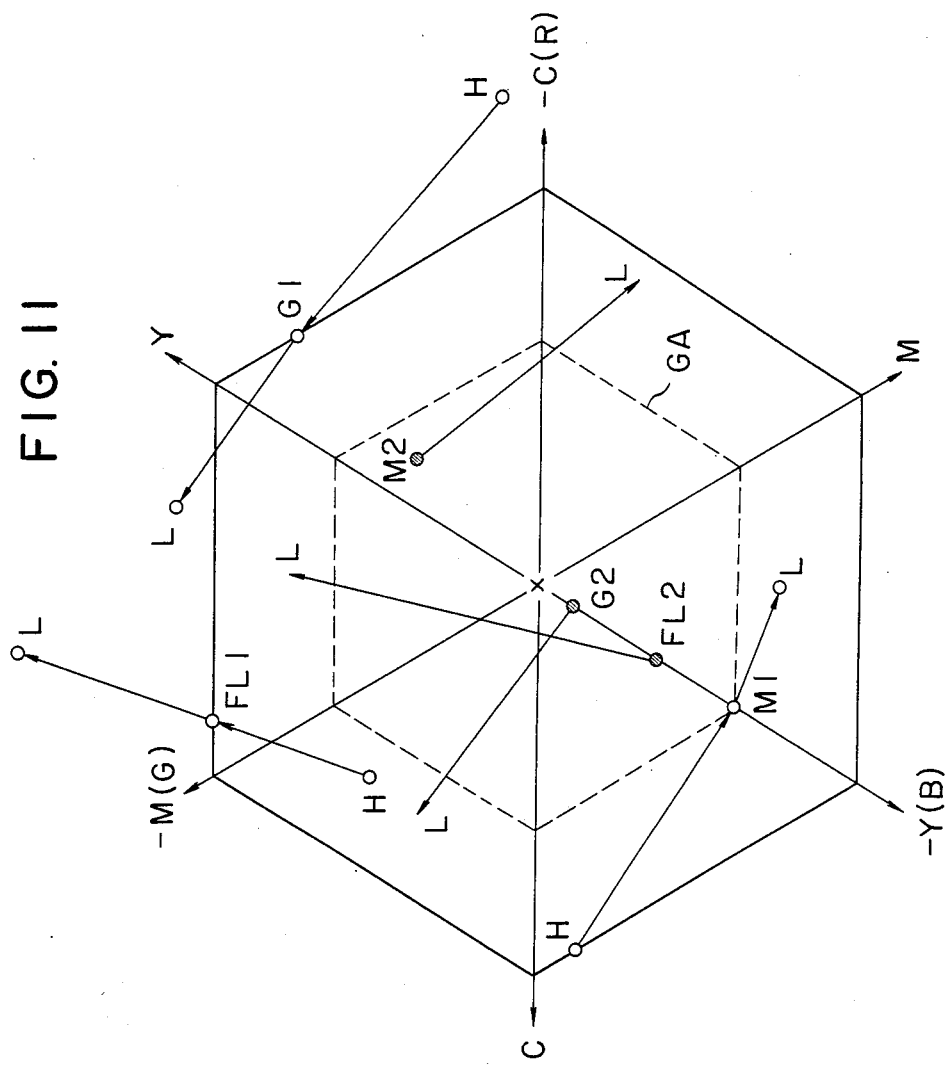
FIG. 11 is a color coordinaters of printing density to explain the movement from full-correction to lowered-correction of this invention in comparison with the conventional process.

The foregoing description mentioned above that it was a general practice to change the level of correction from normal-to-high- or normal-to-lowered-correction. But color change tends to be inaccurate due to optical mixture of three lights at the time of exposure and photometry. FIG. 11 shows the densities in hexagonal color coordinates on a photographic paper printed with changed color correction both by this invention method and the conventional method. Due to the aforementioned reason, no lines pass through the origin point or the 0 point even if correction is intensified as shown in FIG. 11. This means color correction is insufficient for the negative films affected from different light sources or old negative films. Conversely, the full-correction like this invention method can accurately correct colors of negative films which have been exposed to different light sources when photographed. The negative films can further be corrected by lowered correction at small degree of color change (hue change) although non-linear type lines caused by color mixing on the photographic paper remain. The area GA circumscribed by broken lines shows the scope of the printing density which can be permitted as gray area and the points FL1 and FL2 denote the correction levels for the negative films photographed under fluorescent lamps. The points M1 and M2 denote the correction level for the negative films of lowered green sensitivity while the points G1 and G2 denote the correction level for the negative films of increased green sensitivity. If the correction level is changed from normal-correction FL1, M1, G1 to either high-correction H or lowered-correction L, as in the case of conventional process, it is obvious that the correctable area does not overlap the gray area GA. On the other hand, if the correction moves from the full-correction (FL2, M2, G2) to the lowered-correction L as in the case of this invention, all the movements overlap the gray area GA.

The color compensation filter amount can be calculated by the formula (4) as LB·(Bc−Df)+Df, LG·(Gc−Df)+Df, LR·(Rc−Df)+Df and by the formula (7) as below:

$$\begin{bmatrix} b11 & b12 & b13 \\ b21 & b22 & b23 \\ b31 & b32 & b33 \end{bmatrix} \begin{bmatrix} Bc \\ Gc \\ Rc \end{bmatrix}$$

Exposure control is performed by obtaining an amount of compensation filter by either the formula (4) or (7) and controlling filters. It can also be performed by obtaining photometric values B1, G1 and R1 first and then adjusting compensation filters to meet the values. In the latter case, exposure is controlled by obtaining the printing density volumes B1, G1 and R1 with the functions of color compensation filters and the negative film density before the change in color correction level.

Although in actual exposing operation, correction for the change in the light sources and correction for intended printing density should be added to the photometric values Bf to Rf by the full-correction or the photometric values Bl to Rl by the lowered-correction, they are not used as the amount of compensation filter in mathematical operation of color correction. Instead of the formulae (4) and (7), exposure may be controlled according to the formula (1) for instance, by changing color correction first and converting the negative densities (Rn, Gn, Bn) to other three color density values. In this case, the amount of color compensation can be obtained by using the relation between the compensation filter volume and the negative film density before the change and by using the above mentioned converted three color densities instead of the density of the negative film.

Although the foregoing description was given to color negative paper, this invention may be applied for various original prints and copy materials.

The exposure control process according to this invention can control values of exposure control at a higher precision without disturbing color balance for all types of films. The negative films which have been exposed to different light sources or those with color failure can be printed desirably. Even if the correction level is changed from the full-correction, slope-control is not necessary, or hardly necessary, with a slight control added if only visual densities are made to coincide with each other. No density change occurs with the change in color correction. When intended values are clearly set, this invention process may be widely applied, facilitating condition-setting, controlling and manipulating of a color photographic printer and performing stable printing even if a fluctuation takes place in the film processing, etc.

It should be understood that many modifications and adaptations of the invention will become apparent to those skilled in the art and it is intended to encompass such obvious modifications and changes in the scope of the claims appended hereto.

What is claimed is:

1. A control method for controlling the printing exposure amount in a color photographic printer which changes and controls the exposure amount in three primary colors from an exposure amount at a reference condition, and which comprises the steps of:

storing characteristics of a photographic paper for printing;

photographically measuring a density of a film to be printed;

obtaining a desired density which is an estimated value corresponding to a printing density at the reference condition before the changing of the exposure amount using a functional formula which includes the measured density and the stored characteristics;

obtaining a correction amount according to the desired density and an estimated density which is an estimated value of a printing density after the changing of the exposure amount; and controlling an exposure amount by adding or subtracting the correction amount thereto after the changing thereof.

2. A control method according to claim 1, wherein the estimated density is obtained in correspondence with respective film frame pictures.

3. A control method according to claim 1, wherein the estimated density is obtained once and is stored in a memory.

4. A control method according to claim 1, wherein the characteristics are spectrum characteristics for three hues which are used in the photographic paper for printing.

5. A control method according to claim 1, wherein the characteristics are gradation characteristics for three hues which are used in the photographic paper for printing.

6. A control method for controlling the printing exposure amount in a color photographic printer which changes and controls the exposure amount in three primary colors from an exposure amount at a reference condition, and which comprises the steps of:

obtaining lowered color correction values after correction of the exposure amount of the three primary colors by full color correction;

obtaining a first printing density by using the full color correction;

obtaining a second printing density with the lowered color correction values; and correcting exposure control values so as that the first printing density is equal to the second printing density with respect to a visual sensitivity function.

7. A control method for controlling the printing exposure amount in a color photographic printer which changes and controls light intensity in three primary colors by means of color compensation filters of yellow, magenta and cyan, and which comprises the steps of:

obtaining first exposure amounts in the three primary colors according to values photometrically measured by photosensors;

changing the exposure amounts by using a first exposure amount correcting function for full color correction;

obtaining second exposure amounts in the three primary colors by using a second exposure amount correcting function for lowered color correction, which is different for respective film frame pictures, according to the first exposure amounts; and controlling the respective color compensation filters with the second exposure amounts in the three primary colors.

8. A control method for controlling the printing exposure in a color photographic printer which changes and controls the amount of light in three primary colors, and which comprises the steps of:

obtaining a first function of values corresponding to weighted coefficients or specific visual sensitivity coefficients for exposure control values before said changes and said three primary colors;

obtaining a second function of values corresponding to weighted coefficients or specific visual sensitivity coefficients for exposure control values after said changes and said three primary colors; and correcting the exposure control values after said changes so as that said first function is equal to said second function.

* * * * *